United States Patent
Strand

[19]

[11] Patent Number: 5,827,016
[45] Date of Patent: Oct. 27, 1998

[54] OCTAGONAL MILLING INSERT WITH ANTI-RATTLE CONFIGURATION AND STRENGTHENED CUTTING EDGES

[75] Inventor: Bengt Nils Gustav Strand, Fagersta, Sweden

[73] Assignee: Seco Tools AB, Fagersta, Sweden

[21] Appl. No.: 668,258

[22] Filed: Jun. 20, 1996

[51] Int. Cl.$^6$ .................................................. B23B 27/08
[52] U.S. Cl. ........................... 407/115; 407/116; 407/113
[58] Field of Search .................................. 407/115, 116, 407/114, 34, 42, 53, 61, 113

[56] References Cited

U.S. PATENT DOCUMENTS

| | | | |
|---|---|---|---|
| 4,645,384 | 2/1987 | Shimomura | 404/42 |
| 4,681,488 | 7/1987 | Markusson | 407/114 |
| 4,812,087 | 3/1989 | Stashko | 407/42 |
| 4,966,500 | 10/1990 | Tsumjimura et al. | |
| 5,074,720 | 12/1991 | Loqvist et al. | |
| 5,145,294 | 9/1992 | Flueckiger | |
| 5,147,158 | 9/1992 | Riviere | |
| 5,346,336 | 9/1994 | Rescigno | |

*Primary Examiner*—Steven C. Bishop
*Assistant Examiner*—Mark Williams
*Attorney, Agent, or Firm*—Burns, Doane, Swecker & Mathis, L.L.P

[57] ABSTRACT

A cutting tool, for milling, comprises a holder and a cutting insert. The cutting insert has a generally octagonal basic shape and has at least two cutting edges created by a transition between an upper face and an edge face of the cutting insert. The upper face constitutes a rake face and the edge face constitutes a clearance face, created at the transition of two adjacent cutting edges. The edge face forms a clearance angle of at least 20 degrees with a plane extending parallel to a center axis of the insert. The edge face is provided with a step which defines a fracture zone. The step forms an angle with a line extending perpendicular to the center axis. Cutting corners of the insert are beveled to form an angle greater than an angle formed by adjacent cutting edges.

16 Claims, 2 Drawing Sheets

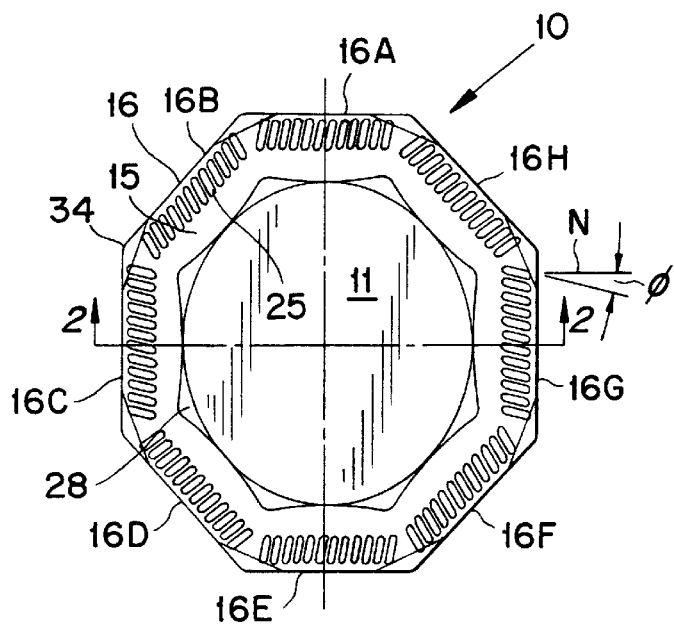
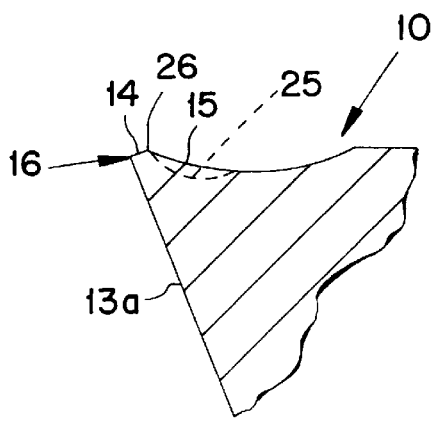
FIG. 1
FIG. 1A
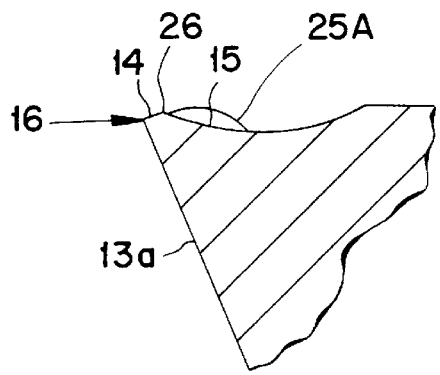
FIG. 1B
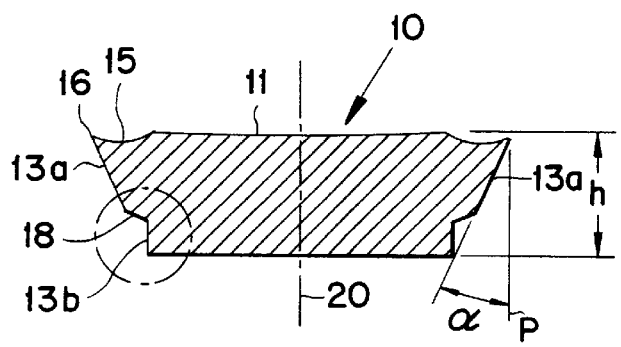
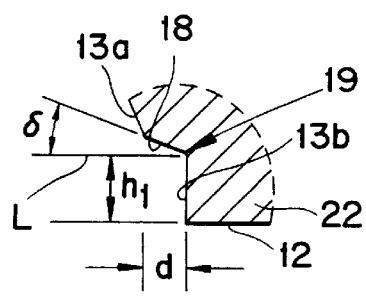
FIG. 2
FIG. 2A

OCTAGONAL MILLING INSERT WITH ANTI-RATTLE CONFIGURATION AND STRENGTHENED CUTTING EDGES

BACKGROUND OF THE INVENTION

The present invention relates to a cutting tool for milling, comprising a holder and a cutting insert, said cutting insert having a generally octagonal basic shape and including at least two cutting edges created by the transition between an upper face and an edge face of the cutting insert, the upper face being a rake face and the edge face being a clearance face, the edge face forming a first clearance angle with a plane parallel to a center axis of the insert. The invention further relates to a milling insert, per se.

In tools for metal cutting having indexable cutting inserts formed of hard and wear resistant material mounted on a tool body, the cutting edges are subjected to wear and sometimes some part of or the entire cutting edge collapses. If a small insert fractures, then only the cutting edge collapses without any risk for damage to the tool body. If a large insert fractures, however, the risk of damage to the tool body increases to an essential degree. If the cutting insert is not seated on a shim, then a fracture of the insert often gives rise to damage of the tool body. In order to avoid such damage, it is usual that the cutting insert rests on a shim of cemented carbide. A usual combination is a cutting insert having a thickness of about 5 mm and a shim having a thickness of 3–5 mm. This results in a total thickness of the cutting insert and the shim of 8–10 mm.

In U.S. Pat. No. 5,147,158 there is depicted a four-sided turning insert having an integrated shim so as to provide a fracture zone. A side face of the shim is separated from a clearance face of the cutting edge by a step formed by a surface extending parallel to a bottom face of the insert. An intersection between the step-defining surface and the side face of the shim forms a corner which defines the fracture zone. If the cutting edge breaks, the resulting crack propagates to that corner rather than to the tool body which supports the insert. Hence, the shim portion of the insert remains intact to protect the tool body.

If the turning insert disclosed in U.S. Pat. No. 5,147,158 were used as a milling insert, it is possible that unacceptable rattling of the insert could occur, producing vibrational marks on the surface being produced. The tendency of a milling insert to rattle is determined by a number of factors, including the size of the angle of the cutting corner, and the size of the clearance angle (i.e. the angle formed between each side clearance face and a plane oriented parallel to the center axis of the insert). That is, the smaller the clearance angle and/or corner angle, the greater the rattling tendency. The insert depicted in U.S. Pat. No. 5,147,158 has cutting corners of about 90 degrees and a clearance angle (measured from FIG. 2 of the patent) of about 7 degrees.

U.S. Pat. No. 5,346,336 discloses a circular metal-cutting insert provided with five equidistant flat facets on the clearance surface. The facets are provided to constitute defined positions or locating surfaces when indexing the cutting insert. Each facet forms an acute angle relative to the central axis of the cutting insert. A retention screw secures the insert to the insert seat of a holder. In the known tool, friction is not a major contributor in preventing unwanted rotation of the insert. The locating surfaces (facets) of the holder will be worn such that the position of the insert in the seat will be increasingly less accurate during use. Furthermore the known insert lacks fracture zones so as to prevent an insert breakage from transferring into the seat or shim.

U.S. Pat. No. 4,966,500 discloses a milling cutter having octagonal or hexagonal cutting inserts. Each cutting insert has a segmented (non linear) major cutting edge, an end cutting edge and a radially inner cutting edge. The radially inner cutting edge is supposed to cut during coring of a work piece. The known insert lacks fracture zones so as to prevent an insert breakage from transferring into the seat or shim. Furthermore the known insert requires a relative high power to perform a cutting operation.

U.S. Pat. No. 5,145,294 discloses an octagonal milling insert having a clearance angle whose magnitude is not specified and which is measured as no greater than about 16–17 degrees from FIG. 9. Any cracks formed in the insert will likely propagate all the way to the bottom surface thereof.

It would be desirable to provide an insert with more than four cutting edges and with a relatively large clearance angle (i.e., a clearance angle substantially greater than 8 degrees). However, the resulting pointed configuration of such an insert could tend to make it relatively prone to impact breakage. Thus, it would also be desirable to offset such a tendency toward breakage, and also to minimize rattling of the insert during a milling operation.

OBJECTS OF THE INVENTION

One object of the present invention is to provide a cutting insert and a cutting tool that overcome the disadvantages discussed above.

Another object of the present invention is to provide a cutting insert and a cutting tool resulting in a very smooth cutting action.

Still another object of the present invention is to provide a positive cutting insert having strong cutting corners although being extremely positive.

SUMMARY OF THE INVENTION

The present invention relates to a cutting insert for milling. The insert includes a generally octagonal body having an upper face defining a rake face, a bottom face, and an edge face extending between the top and bottom faces. A transition between the top face and edge face forms eight cutting edges. Adjacent pairs of the cutting edges form cutting corners. The edge face includes upper and lower portions. The upper portion defines a clearance face forming an angle of at least 20 degrees with a plane oriented parallel to a center axis of the body. The edge face includes a lateral shoulder forming a step situated between the top and bottom faces for dividing the edge face into the upper and lower portions. The step forms a corner defining a fracture zone for guiding, away from the bottom face, a propagating fracture emanating from an upper portion of the body.

Preferably, each of the cutting corners is chamfered such that each cutting corner forms a larger angle than that formed by adjacent cutting edges.

The shoulder preferably forms an angle with a line extending perpendicular to the center axis.

Preferably, a distance from the bottom face to the shoulder is in the range of 15 to 60% of a distance from the bottom face to the top face.

The lower portion of the edge face is preferably situated radially inside of an imaginary downward extension of the upper portion of the edge face.

Preferably, depressions or projections are formed in the chip face in spaced apart relationship along each of the transition edges. The depressions (or projections) intersect the transition edge and extend inwardly therefrom in an oblique direction forming an angle in the range of 5 to 45 degrees, preferably 15 to 40 degrees, with a line extending normal to a respective cutting edge as the insert is viewed in top plan.

The present invention also relates to a cutting tool comprising a holder and a cutting insert mounted in the holder.

BRIEF DESCRIPTION OF THE DRAWINGS

The objects and advantages of the invention will become apparent from the following detailed description of a preferred embodiment thereof in connection with the accompanying drawings, and in which:

FIG. 1 is a plan view of a cutting insert according to the present invention;

FIG. 1A is an enlarged view of a left hand portion of FIG. 2;

FIG. 1B is a view similar to FIG. 1A showing an alternate embodiment;

FIG. 2 is a section taken along line 2—2 in FIG. 1;

FIG. 2A shows a magnified portion of a lower corner of the insert circled in FIG. 2;

DETAILED DESCRIPTION OF PREFERRED EMBODIMENTS OF THE INVENTION

Figure 3:
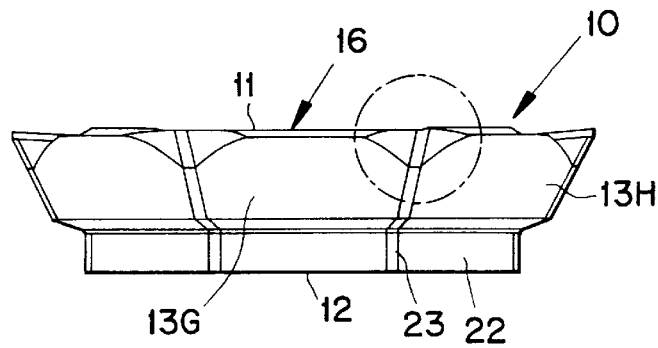
FIG. 3 shows the insert in a side view.

The milling insert 10 depicted in FIGS. 1 to 4 has a generally octagonal basic shape and includes an upper face 11, a lower face 12 and an edge face 13 generally connecting the upper and lower faces 11 and 12, respectively. The insert 10 has a positive geometry, i.e., an upper portion 13a of the edge face defines a clearance face and forms an acute angle with the upper face 11, the latter being a rake face. The upper face 11 includes a chip upsetting face 14 located at the periphery of the insert 10 (see FIG. 1A). The upper face 11 furthermore, includes a chip face 15 sloping inwardly and downwardly from the chip upsetting face 14. The faces 14 and 15 constitute the most peripheral part of the upper face 11. The intersecting line between the chip upsetting face 14 and the edge face 13 forms the overall cutting edge 16, which is defined by eight cutting edges 16A–16H. The chip face 15 is concavely curved as viewed in vertical section (FIG. 1A) and extends inwardly from the chip upsetting face 14 to form a transition edge 26 therewith. A plurality of depressions 25 is formed in the chip face 15, the depressions being spaced apart along the transition edge 26. The depressions 25 preferably intersect the transition edge 26 and extend inwardly therefrom in a direction non-perpendicularly (obliquely) to the associated cutting edge 16 as the insert is viewed in plan (See FIG. 1), whereby each depression 25 forms an angle φ in the range of 5 to 45 degrees, preferably 15 to 40 degrees, relative to a normal N of the associated cutting edge (see FIG. 1). The effect of such design is to minimize heat transfer from the chip to the insert. The design of the upper face 11 is more closely described in U.S. Pat. No. 5,074,720, the description of which is hereby incorporated herein by reference. In lieu of depressions, spaced projections 25A could be employed, as shown in FIG. 1B, such projections also forming the angle φ.

Respective pairs of adjacent cutting edges 16 meet to form a cutting corner 34 having an internal obtuse angle, about 135°. Each cutting edge is concavely curved when seen in a side view, such that the mid section of the edge is closer to the lower face 12 than are the end sections thereof. A ridge 28 provided at each intersection of the chip faces 15 strengthened each corner area and to form the chip generated at the corner 34.

The edge face 13 includes eight segments. An upper portion 13a of each segment of the edge face 13 forms a clearance angle α with a plane P oriented parallel to a center axis 20 of the insert (see FIG. 2). The clearance angle α is at least 20°, preferably at least 25°.

Figure 3A:
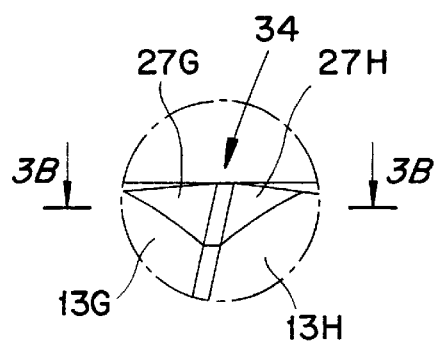
FIG. 3A shows a magnified cutting corner of the insert encircled in FIG. 3.
Figure 4:
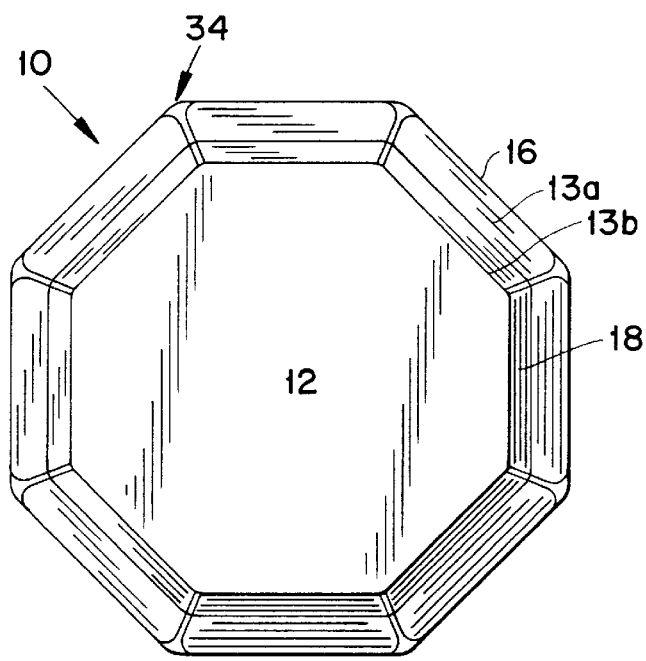
FIG. 4 shows the insert in a bottom plan view.
Figure 3B:
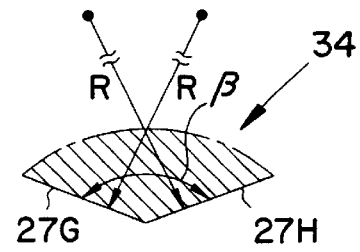
FIG. 3B shows a cross section along line 3B—3B in FIG. 3.

A corner 34 is shown magnified in FIGS. 3A and 3B. Upper ends of the segments 13G and 13H of the edge face 13 include chamfers 27G and 27H, respectively. Each chamfer is located radially inside of a plane containing the associated segment (by "inside of" is meant closer to the center axis 20 of the insert). The chamfers 27G, 27H form an internal, obtuse angle β which is larger than 135° (see FIG. 3B). Each chamfer is defined by a radius R having a magnitude of about 2 to 5 times the largest diameter of the insert. This radius improves the quality of the surface formed on the workpiece. That relatively large angle β will, in combination with the radiused chamfer (e.g. 27G, 27H), strengthen the corner 34 and will produce a very fine surface finish during milling. For instance, with reference to FIG. 5, during a milling operation, the chamfered right-hand end of the cutting edge 16E (i.e. at the end of the edge 16E intersecting the edge 16F) will engage the workpiece, but the rest of the cutting edge 16E will be cleared from the workpiece (i.e. spaced from the surface being generated) by a clearance angle of about 2 degrees.

The upper portions 13a of the eight, planar segments of the edge face 13 taper towards the lower face 12, and imaginary extensions thereof would generally intersect one another at the center line 20 of the cutting insert 10 at a location below the lower face 12.

In the disclosed embodiment, the insert 10 is completely solid but may alternatively be provided with a through-hole arranged coaxial with the center line 20 to receive a clamping screw that secures the insert 10 to the tool holder.

Each segment of the edge face 13 is provided with an inward, downwardly facing shoulder forming a step 18. The upper or first portion 13a of the segment is located above the step 18 and has a positive geometry in order to provide the necessary clearance angle. A lower or second portion 13b of the edge surface 13 forms a peripheral edge of a shim 22 which is of integral one-piece construction with the upper part of the insert. The shim 22 forms the lower face 12 of the insert. The second portion 13b of each segment has a negative geometry, i.e. the second portion 13b is perpendicular to the lower surface 12 and thus forms no clearance angle. Each second portion 13b lies radially inside of an imaginary extension of the first portion 13a. Thus, the lower portions 13b do not need to be ground smooth if the clearance faces (defined by the upper portions 13a) are ground smooth, thereby saving energy. Furthermore the step 18 will then be sufficiently large in the radial direction and will provide a sufficiently sharp corner 19 defining a fracture zone to provide for a favorable control of any cracks emanating during machining. By the term "sharp" is here meant that the corner is intentionally weakened by having a radius of 0 to 0.3 mm, preferably about 0.2 mm. Thus, in the event that the upper portion of the insert breaks, the resulting fracture line will not propagate to the lower face 12 of the shim 22, but rather will propagate to the corner 19. Hence, the upper portion of the insert will break, but the lower shim portion 22 will remain intact, thereby protecting the tool body.

Directing attention to FIGS. 2 and 2A, the following is to be said. The height $h_1$ is 15–60% of the height h, preferably about 25%. This is possible since the anvil or shim 22 constitutes an integral part of the insert 10, i.e. the height $h_1$ corresponds to the height of the integrated shim 22. In order to achieve good performance of the insert 10 it is necessary that the height $h_1$ does not constitute too big a part of the height h since in that case the strength of the cutting edge will be too low. That could result in fractures of the cutting edge also at small loads. The smallest radial distance d from the lower end of the upper portion 13a to the second portion 13b in a plane parallel to the lower face 12 depends on the clearance angle. The distance d is in the range of 0.01–1.0 mm, preferably about 0.1 mm.

The second portion 13b is about parallel with the center axis 20. The step 18 could coincide with a line L extending perpendicular to the center axis 20, but preferably forms an angle δ with that line L. The angle δ is greater than 0° and not greater than 30°, most preferably about 20°.

Eight second portions 13b are formed around the periphery of the shim 22. Two adjacent portions 13b meet in a corner 23 forming an internal obtuse angle, about 135°. The periphery of the shim 22 describes a path of increasing and decreasing radial distances from the center axis 20 of the insert.

Figure 5:
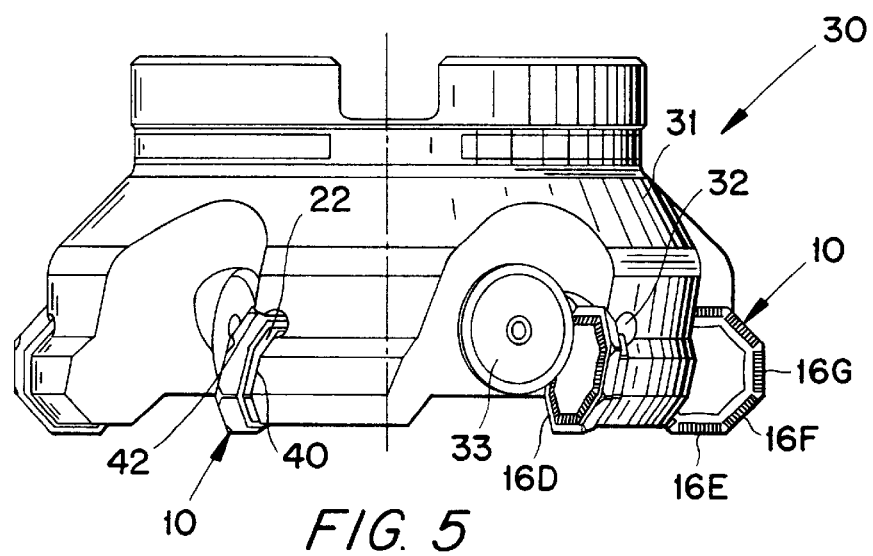
FIG. 5 shown an embodiment of a milling cutter according to the present invention, in a side view.

Turning now to FIG. 5, a milling cutter 30 according to the present invention is shown, including a tool holder 31 and milling inserts 10. The holder 30 is a milling cutter body which has a number of pockets 32 for receiving respective cutting inserts. Each pocket comprises a substantially planar base 40 and two shoulders (only one shoulder 42 being visible). Each shoulder includes a first surface, provided to abut the corresponding first portion 13a of the insert. A threaded boring is provided in the vicinity of the pocket 32 so as to receive a fastening screw 33 to force the insert towards the shoulders and the base, via an eccentric, radially outer part of the screw head. When the insert is to be indexed, the screw 33 is partially unscrewed until the cutting insert can be pulled radially outwardly by hand, and the insert may be rotated by an increment corresponding to 35° counter-clockwise, so that a fresh cutting edge 16E comes in position. Then the insert is pushed into the pocket and the screw is tightened again. The edge 16D is passive and does not cut during milling.

By applying the teachings of the present invention, including a relatively large clearance angle and relatively large cutting corner angle, the normal rattle, originating from the individual cutting edge of conventional milling cutters, can be replaced by a soft whispering sound. The price for such a benefit, however, is a cutting edge sensitive to impact damage during milling resulting from its pointed configuration, due mainly to the relatively large clearance angle of at least 20 degrees. However, by providing the insert with an integral shim, defined by a sharp corner 19, cracks will be stopped from propagating into the holder body. Moreover, the cutting edge is strengthened against breakage since the chamfers 27G and 27H at the cutting corners of the insert enclose an angle β of enlarged magnitude, i.e., the angle β is larger than it would be if it were instead formed by non-chamfered cutting edges. The present insert provides an economical solution to the user, by having eight cutting edges, without an increased risk of cutting edge breakage or damage to the tool holder that would normally be expected from such an insert. One field of milling which is especially improved by the present invention is when milling a workpiece (e.g. formed of aluminum) such that a surface is generated having a thin flange remaining thereon.

Although the present invention has been described in connection with a preferred embodiment thereof, it will be appreciated by those skilled in the art that, additions, deletions, modifications, and substitutions not specifically described may be made without departing from the spirit and scope of the invention as defined in the appended claims.

What is claimed is:

1. A milling insert including a generally octagonal body having a top face defining a rake face, a bottom face, and an edge face extending between said top and bottom faces; a transition between said top face and edge face forming eight cutting edges; adjacent pairs of said cutting edges forming cutting corners; said edge face including upper and lower portions; said upper portion defining a clearance face forming an angle of at least 20 degrees with a plane oriented parallel to a center axis of the body; said edge face including a lateral shoulder forming a step situated between said top and bottom faces for dividing said edge face into said upper and lower portions and forming a corner defining a fracture zone for guiding, away from said bottom face, a propagating fracture emanating from an upper portion of said body, wherein said shoulder is not parallel to and forms an angle with a line extending perpendicular to a center axis of said body.

2. The milling insert according to claim 1, wherein each of said cutting corners is chamfered.

3. The milling insert according to claim 2, wherein said shoulder extends laterally inwardly to intersect said lower portion of said edge face and form therewith said corner which defines said fracture zone.

4. The milling insert according to claim 1, wherein a distance from said bottom face to said shoulder is in the range of 15 to 60% of a distance from said bottom face to said top face.

5. The milling insert according to claim 4, wherein said lower portion of said edge face is situated radially inside of an imaginary downward extension of said upper portion of said edge face.

6. The milling insert according to claim 5, wherein said lower portion of said edge face is oriented parallel to said center axis of said body; said top face forming a chip upsetting face disposed immediately adjacent each cutting edge, and a chip face extending inwardly from an inner end of said chip upsetting face; said chip face being concavely curved and intersecting said chip upsetting face to form transition edges therewith.

7. The milling insert according to claim 6, wherein depressions are formed in said chip face in spaced apart relationship along each of said transition edges; the depressions intersecting said transition edge and extending inwardly therefrom in an oblique direction forming an angle in the range of 5 to 45 degrees with respect to a line normal to a respective cutting edge, as said insert is viewed from above.

8. The milling insert according to claim 5, wherein projections are formed in said chip face in spaced apart relationship along each of said transition edges; the projections intersecting said transition edge and extending inwardly therefrom in an oblique direction forming an angle in the range of 5 to 45 degrees with respect to a line normal to a respective cutting edge, as said insert is viewed in plan.

9. A milling tool comprising a holder and a cutting insert mounted in said holder; said insert including a generally octagonal body having a top face defining a rake face, and an edge face extending from said top face; a transition between said top face and edge face forming at least two cutting edges; said edge face including upper and lower portions; said upper portion defining a clearance face forming an angle of at least 20 degrees with a plane oriented parallel to a center axis of said body; said edge face including a lateral shoulder forming a step situated below said top face for dividing said edge face into said upper and lower portions and forming a corner defining a fracture zone for guiding a propagating fracture emanating from an upper portion of said body, wherein said shoulder is not parallel to and forms an angle with a line extending perpendicular to a center axis of said body.

10. The milling tool according to claim 9, wherein each of said cutting corners is chamfered.

11. The milling tool according to claim 10, wherein said shoulder extends laterally inwardly to intersect said lower portion of said edge face and form therewith said corner which defines said fracture zone.

12. The milling tool according to claim 9, wherein a distance from said bottom face to said shoulder is in the range of 15 to 60% of a distance from said bottom face to said top face.

13. The milling tool according to claim 12, wherein said lower portion of said edge face is situated radially inside of an imaginary downward extension of said upper portion of said edge face.

14. The milling tool according to claim 12, wherein said lower portion of said edge face is oriented parallel to said center axis of said body; said top face forming a chip upsetting face disposed immediately adjacent each cutting edge, and a chip face extending inwardly from an inner end of said chip upsetting face; said chip face being concavely curved and intersecting said chip upsetting face to form a transition edge therewith.

15. The milling tool according to claim 14, wherein depressions are formed in said chip face in spaced apart relationship along each of said transition edges; the depressions intersecting said transition edge and extending inwardly therefrom in an oblique direction forming an angle in the range of 5 to 45 degrees with respect to a line normal to a respective cutting edge, as said insert is viewed from above.

16. The milling tool according to claim 14, wherein projections are formed in said chip face in spaced apart relationship along each of said transition edges; the projections intersecting said transition edge and extending inwardly therefrom in an oblique direction forming an angle in the range of 5 to 45 degrees with respect to a line normal to a respective cutting edge, as said insert is viewed from above.

* * * * *